United States Patent
Goyal et al.

(10) Patent No.: US 6,785,260 B1
(45) Date of Patent: Aug. 31, 2004

(54) METHOD AND APPARATUS FOR ROUTING OF BEST-EFFORT AND QUALITY OF SERVICE FLOWS

(75) Inventors: Pawan Goyal, Mountain View, CA (US); Gisli Hjalmtysson, Gillette, NJ (US)

(73) Assignee: A.T.&T. Corp., New York, NY (US)

( * ) Notice: Subject to any disclaimer, the term of this patent is extended or adjusted under 35 U.S.C. 154(b) by 0 days.

(21) Appl. No.: 09/466,159

(22) Filed: Dec. 18, 1999

Related U.S. Application Data
(60) Provisional application No. 60/112,789, filed on Dec. 18, 1998.

(51) Int. Cl.[7] ............................................. H04L 12/28
(52) U.S. Cl. ...................................... 370/351; 370/401
(58) Field of Search ................................ 370/232, 233, 370/234, 235, 238, 238.1, 254, 444, 400, 401, 351, 402, 352, 353, 354, 355, 356, 229, 395.21, 395.42; 709/238, 240, 241

(56) References Cited

U.S. PATENT DOCUMENTS

| | | | | |
|---|---|---|---|---|
| 5,940,372 A | * | 8/1999 | Bertin | 370/238 |
| 5,995,503 A | * | 11/1999 | Crawley | 370/351 |
| 6,252,856 B1 | * | 6/2001 | Zhang | 370/254 |
| 6,292,489 B1 | * | 9/2001 | Fukushima | 370/401 |
| 6,321,271 B1 | * | 11/2001 | Kodialam | 370/351 |
| 6,347,078 B1 | * | 2/2002 | Narvaez-Guarnieri | 370/230 |
| 6,400,681 B1 | * | 6/2002 | Bertin | 370/218 |
| 6,493,317 B1 | * | 12/2002 | Ma | 370/237 |
| 6,538,989 B1 | * | 3/2003 | Carter | 370/229 |
| 6,538,991 B1 | * | 3/2003 | Kodialam | 370/229 |

OTHER PUBLICATIONS

"Routing High–bandwidth traffic in min–max fair share networks", Qingming Ma et al, Aug. 1997.*
"Routing traffic with Quality–of–Service Guarantees in Integrated Services Networks", Qinming Ma et al, 1997.*
"On path selection for traffic with bandwidth guarantees", Qinming Ma et al, IEEE, Oct. 1997.*
"Quality–of–service routing for traffic with performance guarantees", Qinming Ma et al, 1997.*

* cited by examiner

*Primary Examiner*—Douglas Olms
*Assistant Examiner*—Ricardo M. Pizarro

(57) ABSTRACT

The present invention permits quality-of-service routing without using any flow pinning or per-flow state mechanisms. In accordance with the present invention, load insensitive routing techniques are utilized for QoS traffic while load sensitive routing techniques are utilized for best effort traffic. In accordance with a preferred embodiment of the present invention, conventional static shortest path routing is utilized for flows that require QoS guarantees while known QoS routing techniques are utilized for best effort flows. Unlike the prior art, a single queue per class per link can be utilized at a network node. The present invention has numerous advantages over the prior art including reduced protocol overhead, lower cost, and reduced route instability.

12 Claims, 1 Drawing Sheet

METHOD AND APPARATUS FOR ROUTING OF BEST-EFFORT AND QUALITY OF SERVICE FLOWS

CROSS REFERENCE TO RELATED APPLICATIONS

This application claims priority to Provisional Application Serial No. 60/112,789, filed on Dec. 18, 1998, entitled "QoS Routing for Best-effort Flows," the content of which is incorporated by reference herein.

FIELD OF THE INVENTION

The present invention relates generally to communication networks, and, more particularly, to routing of best-effort and quality-of-service flows in a communication network.

BACKGROUND OF THE INVENTION

In packet networks such as the Internet, a simple static shortest path routing algorithm is commonly employed. A packet is sent on the shortest path to the destination. To determine the shortest path each link is assigned a weight and the shortest path is the one with the smallest aggregate weight. If there are multiple shortest paths, the shortest path is chosen arbitrarily. The key characteristic of this routing scheme is that the weights are assigned statically. The routes are static—not in the sense that the routes cannot change—but in the sense that the routes are load insensitive. Hence, route changes occur only when a change in the topology of the network occurs, i.e. a link is deleted or added. This topology-driven static shortest path routing may suffice in networks that provide a single best effort service in which there is no guarantee about whether and when a packet will be delivered. It may, however, not be adequate in networks that wish to provide Quality of Service ("QoS") guarantees. For example, with reference to FIG. 1, consider if a network 100 provided bandwidth guarantees to a flow. A flow, as is known in the art, is a sequence of packets from a source to a destination and, or our purposes, is synonymous with a connection. Assuming each link specified in FIG. 1 is given an identical weight, all flows originating from node 101 and destined to 105 will be routed over path 101–102–103–104–105. If a large number of flows originating from 101 and terminating at 105 request guaranteed bandwidth, then the links 102–103 and 103–104 may get saturated and flows may be denied their request. This may occur even though the alternate path 101–102–106–107–104–105 between 101 and 105 may have the capacity to support the flows that have been denied their request.

In order to exploit the available capacity on alternate routes, the concept of QoS routing has been proposed. See, e.g., E. Crawley et al., "A Framework for QoS Based Routing in the Internet," RFC 2386, IETF Network Working Group, August 1998; R. Guerin et al., "QoS Routing Mechanisms and OSPF Extensions," RFC 2676, IETF Network Working Group, August 1999, both of which are incorporated herein by reference. There are a large number of QoS routing algorithms. The characteristic common to all of these schemes is that they employ dynamically obtained information about load at each of the links to determine the path over which a flow should be routed. The path of a flow may be determined by source routing in which a flow setup message carries the entire path for the flow or by hop-by-hop routing. QoS routing algorithms have a few limitations.

First, in order to route packets of flows with the same destination over multiple routes, they require a connection-oriented network layer (i.e., the ability to "pin" the path of a flow). Thus, it is difficult to employ them in connectionless networks such as the Internet without substantial modifications to the basic architecture. Second, they can introduce routing and load oscillations resulting in higher instability in the performance seen by best-effort traffic. To illustrate, when the path 101–102–103–104 becomes loaded in FIG. 1, traffic will be diverted onto path 101–102–106–107–104. This will increase the load on path 101–102–106–107–104. Subsequently, when the load on path 101–102–103–104 reduces, the traffic will again be diverted onto path 101–102–103–104. Thus, the best effort traffic flowing on those two paths will observe high instability in the performance—which is undesirable.

Accordingly, there is a substantial need for introducing new ways of routing QoS and best effort flows that avoids the disadvantages of the prior art.

SUMMARY OF THE INVENTION

The present invention permits quality-of-service routing without using any flow pinning or per-flow state mechanisms. In accordance with the present invention, load insensitive routing techniques are utilized for QoS traffic while load sensitive routing techniques are utilized for best effort traffic. In accordance with a preferred embodiment of the present invention, conventional static shortest path routing is utilized for flows that require QoS guarantees while known QoS routing techniques are utilized for best effort flows. Unlike the prior art, a single queue per class per link can be utilized at a network node. The present invention has numerous advantages over the prior art including reduced protocol overhead, lower cost, and reduced route instability.

These and other advantages of the invention will be apparent to those of ordinary skill in the art by reference to the following detailed description and the accompanying drawings.

DETAILED DESCRIPTION

The embodiments of the present invention apply to a packet communication network supporting two or more traffic classes: quality-of-service traffic (for example, with bandwidth, jitter, and delay guarantees) and best effort traffic (which can be treated adaptively with no guarantees). The QoS traffic has priority in bandwidth allocation, but the best effort traffic should not be a negligible part of the load on the network. There should be a significant amount of elastic best-effort traffic in addition to the traffic that requires a QoS guarantee. Thus, it is desirable to provide good best effort service in the network—while still meeting QoS guarantees.

In accordance with a preferred embodiment of the present invention, the conventional routing methods described in the background are "flipped" around. Namely, conventional shortest path routing is utilized for flows that require QoS guarantees while known QoS routing techniques are utilized for best-effort flows.

Figure 1:
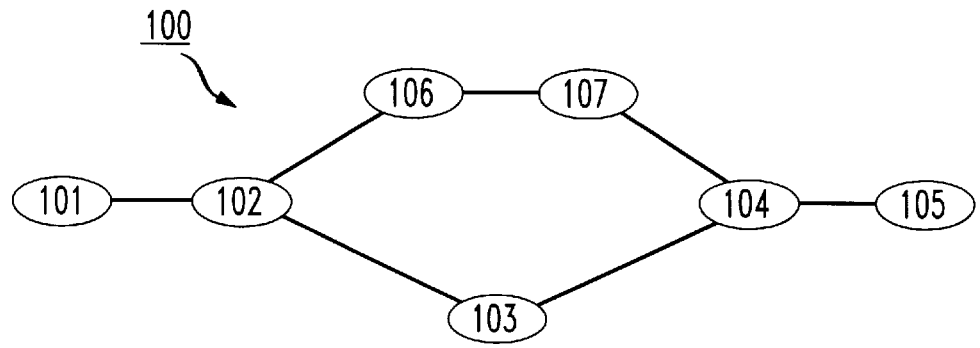
FIG. 1 is a diagram of a packet communication network.
Figure 2:
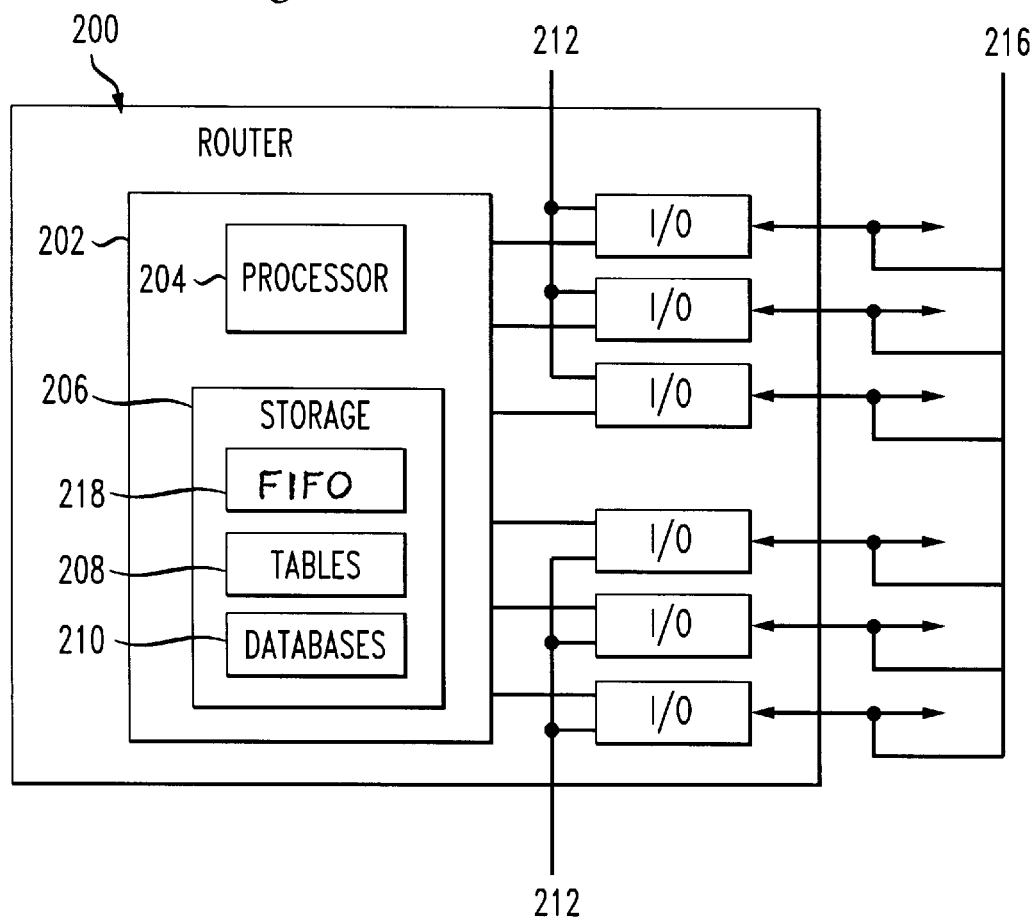
FIG. 2 is a block diagram of a router suitable for practicing embodiments of the present invention.

With reference to FIG. 2, a block schematic diagram of a network node, here an IP router, is shown to illustrate the principles of the present invention. The router has multiple input/output interfaces coupled to a routing engine 202 which provide a physical connection to one or more network links 216. The routing engine 202 has a processor 204 and a storage device 206. Storage device 206 may be any suitable computer readable memory device, such as one or more random access memory (RAM) devices, disk devices, or other mechanisms for storing data. The storage device 206 contains various computer program segments that when executed by processor 204 performs the functionality of the various embodiments of the present invention. The router 200 also stores multiple routing tables 208 as well as a database 210 of any other information needed to properly forward packets. In a preferred embodiment of the present invention, the router 200 stores one routing table for each class of traffic and uses a single FIFO queue 218 per class per link.

As the router 200 receives traffic that requires QoS guarantee, it forwards that traffic using conventional topology-based static shortest path routing algorithms. Since the topology of the network changes slowly in general, there is a low protocol overhead. The QoS routing table is essentially static making the routes very stable. The router 200 avoids tracking per flow state at each hop and instead uses an aggregated state. No flow pinning is necessary. The router 200 advantageously avoids the costly flow setup and maintenance associated with the prior art. The router 200 also can implement QoS guarantees with a single queue per class and without using multiple queues, as in the prior art.

As the router 200 receives best effort traffic, it forwards that traffic using any of the number of QoS routing algorithms. Dynamically obtained load information can be used to compute the shortest path routes for best-effort traffic. Prior art techniques for distributing load information and using it for computing shortest paths for QoS routing can be utilized, i.e. link load information can be disseminated using known QoS extensions to the OSPF routing protocol. See, e.g., RFC 2676. The particular distribution of the processing load required to compute the dynamic routes in the network is not relevant to the present invention. The routing work can be shared among all the nodes, as in hop-by-hop routing methods; or the entire route can be selected using some form of explicitly routed technique (e.g. source-directed routing).

The routing of the best effort traffic in accordance with the present invention does not require the maintenance of per flow state. Rather, destination-based routing methods such as multipath techniques can be utilized to balance the load of the best effort traffic. For example, where current loads permit 40% of the best effort traffic to flow along one link and 60% of the best effort traffic to flow along another link, the router 200 can compute a hash that distributes the best effort traffic along the two links in a manner that balances the load approximately 40/60. Even when some load splitting is performed on the best effort traffic, the state requirements remain small and the independent of the number of flows.

The routing of the best effort traffic need not be optimized, but need only be kept within an acceptable margin, thus minimizing protocol overhead. The best effort routes can change slowly and independently of best effort load. The dynamic routing need only ensure that the best effort traffic is not permanently starved of network resources. Unlike the prior art where best effort traffic is basically ignored or penalized by QoS routing techniques, best effort traffic here is provided more stable and consistent aggregate performance.

In a preferred embodiment of the present invention, the router 200 uses the load on the QoS class—not the best effort class—for computing the best effort shortest paths. Thus, unlike traditional QoS routing where the path is governed by the load imposed by QoS flows, in this embodiment the path chosen for best-effort traffic is not governed by the best effort load. This reduces the coupling in the routing control loop, and has the advantage of avoiding the oscillation of best effort routes described in the background. Accordingly, this reduces route instability; the route should be more stable. This also is a distinguishing characteristic of the present invention embodiment from prior art ARPANET dynamic routing techniques that made dynamic routing decisions for best-effort traffic based on measured load of best-effort traffic itself.

The present invention turns prior art QoS routing conventions upside down. The present invention recognizes that QoS routing techniques are generally only advantageous when there is an imbalance in load and capacity. Persistent imbalances can be addressed by a network provider through adequate provisioning. QoS routing techniques strictly speaking only need to address transient imbalances on-line.

The present invention has numerous advantages over the prior art, not the least of which is that it avoids the requirement of flow pinning or connection-oriented per flow state at each hop. Traditional QoS routing is terribly costly. The protocol overhead is significant since the global link state must be kept up-to-date and there is costly setup for each flow, whether by source routing or per hop computations. The present invention can provide QoS on the Internet without converting it into a connection-oriented network. Since packets of best-effort flows as well as those that require QoS are routed using conventional shortest path datagram routing, the present invention does not require a connection oriented network layer.

Embodiments of the present invention can be realized at a lower cost than prior art QoS routing. In case of flows that require QoS guarantee, if a path that can meet the requirements cannot be found, the flow is rejected which results in a loss of revenue. To ameliorate this problem, dissemination of load information has to be done at a fast time scale. In contrast, in the case of best-effort traffic, if the traffic is not routed over the best possible path, only performance is degraded. Thus, load information can be disseminated at a slower time-scale. This will also ensure that best-effort flows will be rerouted infrequently, if at all, and hence will observe very little packet reordering.

The present invention can be readily generalized to multiple service classes. For example, the highest QoS flows can continue to use the shortest path while lower levels of QoS flows can use shortest paths recursively dependent on the highest flow paths.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method of routing packets through a packet communication network comprising the steps of:

determining whether a packet flow requires a quality-of-service guarantee;

if the packet flow requires a quality-of-service guarantee, utilizing a load insensitive routing algorithm for the flow; and if the packet flow does not require a quality-of-service guarantee, utilizing a load sensitive routing algorithm for the flow.

2. The method of claim 1 wherein the load sensitive routing algorithm dynamically computes a shortest path route based on load information about links in the network.

3. The method of claim 2 wherein the dynamically computed path is computed using a hop-by-hop routing.

4. The method of claim 2 wherein the dynamically computed path is computed using explicit routing.

5. The method of claim 2 wherein the dynamically computed path is computed using multipath routing.

6. The method of claim 1 wherein the load insensitive routing algorithm computes a shortest path route based on weights statically assigned to links in the network.

7. The method of claim 1 wherein the network utilizes the Internet Protocol.

8. The method of claim 7 wherein the network is a part of the Internet.

9. A packet network node adapted to handle different classes of quality-of-service comprising:

a plurality of links to other nodes;

a queue for each class of packets and for each link;

a processor adapted to route packets based on class and which utilizes only a single queue per class per link, wherein the processor utilizes a load insensitive routing algorithm for packets that require a quality-of-service guarantee and a load sensitive routing algorithm for packets that do not require a quality-of-service guarantee.

10. The network node of claim 9 wherein the node is an Internet Protocol router.

11. A method of operating a packet communication network comprising the steps of:

providing quality-of-service guarantees to a class of packets; and routing the class of packets using a load insensitive algorithm for the flow without maintaining per flow state at each router in the network.

12. The method of claim 11 further comprising the step of routing packets requiring only best effort without maintaining per flow state.

* * * * *